US010308498B2

(12) United States Patent
Larsson et al.

(10) Patent No.: US 10,308,498 B2
(45) Date of Patent: Jun. 4, 2019

(54) METHODS AND DEVICES FOR HANDLING A FUEL DISPENSER HOSE

(71) Applicant: Wayne Fueling Systems LLC, Austin, TX (US)

(72) Inventors: Bengt I. Larsson, Skivarp (SE); Mattias G. Martensson, Kavlinge (SE); Hanna Helgesson, Dalby (SE)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

(21) Appl. No.: 15/222,280

(22) Filed: Jul. 28, 2016

(65) Prior Publication Data

US 2018/0029873 A1 Feb. 1, 2018
US 2018/0222742 A9 Aug. 9, 2018

Related U.S. Application Data

(63) Continuation of application No. 14/719,485, filed on May 22, 2015, now Pat. No. 9,470,340.

(30) Foreign Application Priority Data

May 26, 2014 (SE) ...................................... 1450622

(51) Int. Cl.
*B67D 7/40* (2010.01)
*B67D 7/04* (2010.01)
(Continued)

(52) U.S. Cl.
CPC ................ *B67D 7/40* (2013.01); *B67D 7/04* (2013.01); *B67D 7/84* (2013.01); *F16L 3/012* (2013.01)

(58) Field of Classification Search
CPC .... B67D 7/40; B67D 7/84; B67D 7/04; F16L 3/012
(Continued)

(56) References Cited

U.S. PATENT DOCUMENTS 1,427,529 A * 8/1922 Gibbs .................... G07F 17/06 137/355.18
1,468,620 A * 9/1923 Addy ...................... B60S 5/04 137/355.23
(Continued)

FOREIGN PATENT DOCUMENTS

EP 0369089 A1 5/1990
EP 0647587 A1 4/1995
(Continued)

OTHER PUBLICATIONS

Elastic. Merriam-Webster [online], [retrieved on Jun. 25, 2018]. Retrieved from the Internet <URL: https://www.merriam-webster.com/dictionary/elastic>.*
(Continued)

*Primary Examiner* — Robert K Arundale
*Assistant Examiner* — J. W.
(74) *Attorney, Agent, or Firm* — Mintz Levin Cohn Ferris Glovsky and Popeo, P.C.

(57) ABSTRACT

Embodiments of the invention are based on the idea of providing a device (2) for handling a hose (3) and a fuel dispensing unit (1) having such a device (2). This is basically achieved by an elastic element (13) that is adapted to extend within a frame element (8) and to be guided by a guiding element (9, 10), and by a hose guiding means (15) which is movable away from said frame element (8) allowing said hose (3) to be pulled from an idle position to an operating position when said elastic element (13) is extended.

16 Claims, 3 Drawing Sheets

(51) Int. Cl.
*B67D 7/84* (2010.01)
*F16L 3/01* (2006.01)

(58) Field of Classification Search
USPC ............ 137/355.16, 355.23, 355.25, 355.27, 137/355.28, 355.17–355.22, 355.24, 137/355.26; 242/380; 222/527; 248/75–93
See application file for complete search history.

(56) References Cited

U.S. PATENT DOCUMENTS

| | | | | |
|---|---|---|---|---|
| 2,002,777 | A | 5/1935 | Johnson | |
| 2,545,063 | A * | 3/1951 | Wolfe | B67D 7/40 137/355.2 |
| 2,639,944 | A * | 5/1953 | Higginbotham | B67D 7/40 137/355.23 |
| 2,694,601 | A * | 11/1954 | Higginbotham | B67D 7/40 137/355.25 |
| 2,742,320 | A * | 4/1956 | Grise | B67D 7/40 137/355.23 |
| 2,744,788 | A | 5/1956 | Grise | |
| 2,768,522 | A * | 10/1956 | Henke | G01F 25/0007 248/75 |
| 2,896,659 | A * | 7/1959 | Erickson | B67D 7/40 137/355.21 |
| 2,935,080 | A | 5/1960 | Klimek | |
| 4,042,184 | A * | 8/1977 | Langenohl | B65H 75/368 242/388.9 |
| 4,131,218 | A | 12/1978 | Tatsuno | |
| 4,305,553 | A * | 12/1981 | Coquerel | B65H 75/48 137/355.25 |
| 4,930,717 | A * | 6/1990 | de la Haye | B67D 7/40 242/388.9 |
| 5,651,478 | A * | 7/1997 | Tatsuno | B60S 5/02 222/135 |
| 5,775,354 | A * | 7/1998 | Upton | B65H 75/48 137/1 |
| 5,794,648 | A * | 8/1998 | Jentzsch | B65H 75/44 137/355.22 |
| 6,113,039 | A * | 9/2000 | Riffle | A62C 33/04 222/74 |
| 6,199,579 | B1 * | 3/2001 | Taylor | B67D 7/40 137/355.22 |
| 6,328,060 | B1 * | 12/2001 | Smith | B67D 7/40 137/355.2 |
| 6,334,457 | B1 * | 1/2002 | Baker, IV | B67D 7/40 137/1 |
| 8,230,876 | B2 | 7/2012 | Gunnarsson et al. | |
| 2008/0000528 | A1 * | 1/2008 | Gunnarsson | B67D 7/40 137/355.23 |
| 2011/0240685 | A1 * | 10/2011 | Ingold | B67D 7/40 222/527 |
| 2013/0001246 | A1 * | 1/2013 | Birkler | B67D 7/406 222/23 |
| 2015/0152974 | A1 * | 6/2015 | Teel, Jr. | F16K 31/46 137/553 |
| 2018/0079638 | A1 * | 3/2018 | Larsson | B67D 7/40 |

FOREIGN PATENT DOCUMENTS

| | | | |
|---|---|---|---|
| EP | 2006245 | A1 | 12/2008 |
| EP | 2147892 | A1 | 1/2010 |
| EP | 2163511 | A1 | 3/2010 |
| GB | 442556 | A | 2/1936 |
| JP | S50148918 | A | 11/1975 |
| JP | S5744096 | A | 3/1982 |
| JP | 3075059 | B2 | 8/2000 |
| WO | 2000015542 | A1 | 3/2000 |

OTHER PUBLICATIONS

Extended European Search Report dated Sep. 28, 2015, for EP Patent Application No. 15168444.6.

* cited by examiner

METHODS AND DEVICES FOR HANDLING A FUEL DISPENSER HOSE

CROSS REFERENCE TO RELATED APPLICATIONS

The present application is a continuation of U.S. application Ser. No. 14/719,485, filed May 22, 2015, and entitled "Device for Handling a Hose and a Fuel Dispensing Unit Having Such a Device," which is a national application of Swedish Patent application No. 1450622-4, filed on May 26, 2014, and entitled "Device for Handling a Hose and a Fuel Dispensing Unit Having Such a Device," which are hereby incorporated by reference herein in their entireties.

FIELD

The field of the invention generally relates to the field of fuel dispensing units and more particularly to a device for handling a hose.

BACKGROUND

A fuel dispensing unit, such as a petrol pump typically comprises a pump part standing on the ground, a display part positioned above the pump part and showing the chosen type of petrol, cash readout, volume readout etc., and a column or frame to which one or more petrol hoses are connected.

When the tank of a vehicle is to be filled up, the driver parks the vehicle beside the petrol pump and opens the cover or cap of the petrol tank. The driver then selects the desired type of petrol and places the pump nozzle in the inlet of the vehicle's petrol tank and puts in the desired volume of petrol.

A difficulty that may arise in connection with filling-up is that the hose does not reach to the vehicle if parked a distance from the petrol pump. The reason why the vehicle has not been parked sufficiently close to the pump may be difficulty in maneuvering owing to a limited space round the petrol pump. To allow the hose to reach the vehicle, it is usually necessary for the driver to park his vehicle so that the side of the vehicle where the filler cap is positioned faces the petrol pump. It is not always known to a driver of an unfamiliar vehicle whether the filler cap is positioned on the left or right side. This may result in the driver by mistake parking the vehicle on the wrong side of the pump and thus not being able to fill up the tank without moving the vehicle to the other side of the petrol pump since the hose does not reach all the way round the vehicle.

One way of facilitating access to the petrol pump is to provide it with a longer hose. This may, however, cause problems since a longer hose may tend to land on the ground when not used and thus get stuck in or be damaged by passing cars or other vehicles. To prevent this, the column or frame may be provided with some kind of returning mechanism for the hose.

A problem common for the hose returning devices described above is their size, or their extension within the fuel dispensing unit, which results in bulky and complicated structures.

SUMMARY

Embodiments of the invention include a device for handling a hose and a fuel dispensing having such a device.

Such embodiments generally aim at eliminating or at least reducing the problems discussed above as well as other problems known in the art.

In one embodiment, a device for handling a hose comprises a frame element, said frame element being hollow and including a guiding element, a hose guiding means arranged outside of said frame element and adapted to guide said hose, and an elastic element which is attached to a fixed point in relation to said frame element at one end and to said hose guiding means at the other end. The device is characterized in that said elastic element is adapted to extend within said frame element and to be guided by said guiding element, and that said hose guiding means is movable away from said frame element allowing said hose to be pulled from an idle position to an operating position when said elastic element is extended. This is advantageous in that a robust and space-saving device is provided, which enables a smooth and flexible handling of the hose. Further, due to the design of the frame element and the guiding element included therein, the risk of entangling with the hose is eliminated.

According to another aspect a fuel dispensing unit comprises such a device for handling a hose.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

The term "vertically" means the vertical direction in relation to the device when in an upright position.

The term "horizontally" means the horizontal direction in relation to the device when in an upright position.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION

Figure 1:
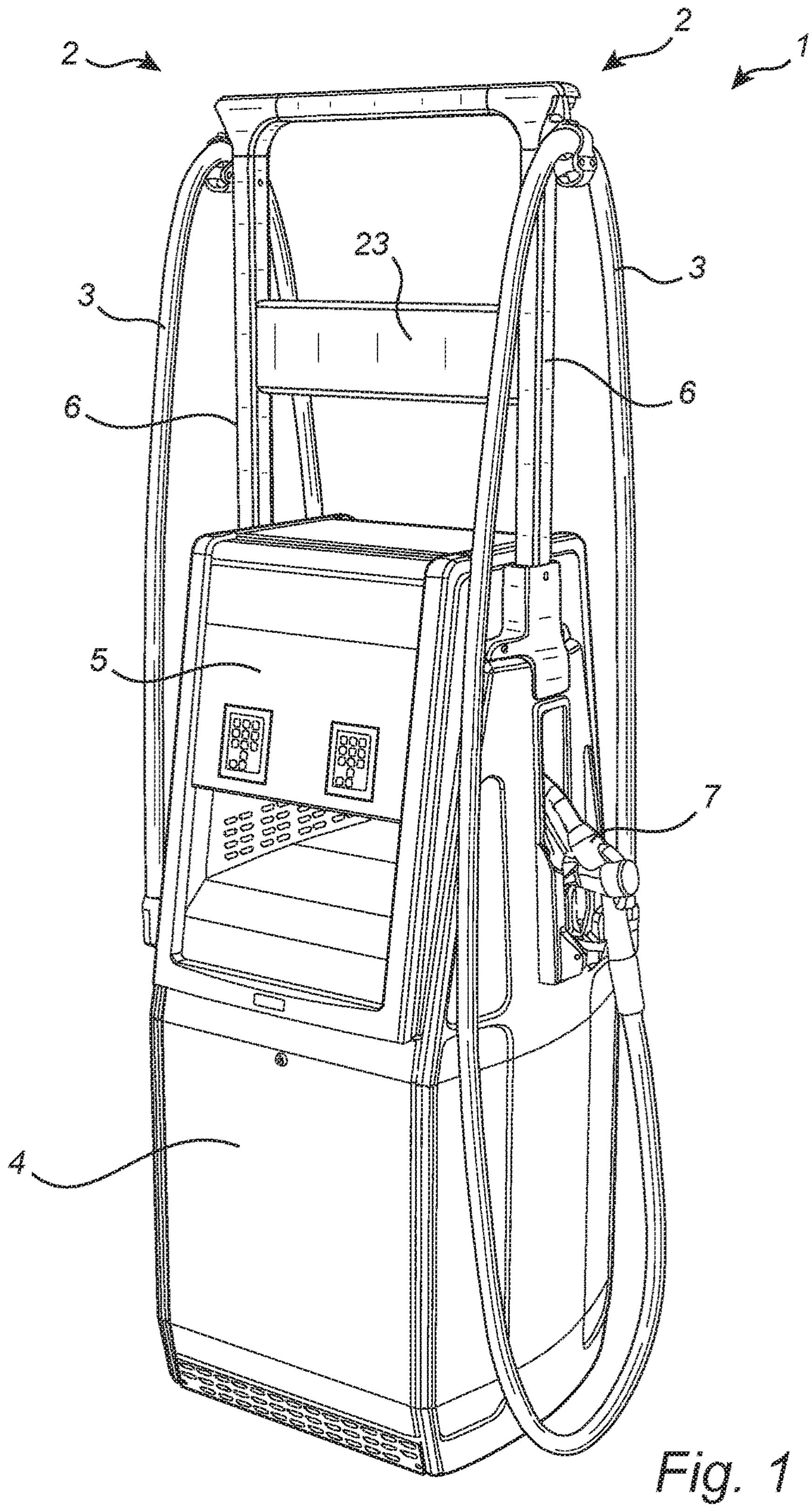
FIG. 1 is a perspective view of a fuel dispensing unit having a device according to a first exemplary embodiment of the invention.

FIG. 1 illustrates a fuel dispensing unit 1 having a device 2 for handling a hose 3 provided on each side of the fuel dispensing unit 1. The fuel dispensing unit 1 has an electrical cabinet 5 containing all the electronics for the fuel dispensing unit 1, a hydraulic cabinet 4 containing fuel dispensing means (not shown), e.g. fuel metering means, valves, vapour recovery system etc, and a column 6 (on each side of the fuel dispensing unit 1) extending upwards vertically above the electrical cabinet 5. The fuel dispensing unit 1 is connected to an underground reservoir (not shown) containing fuel. When filling up the tank of a motor vehicle, the fuel is pumped from the underground reservoir by means of a pump (not shown) which is located in the hydraulic cabinet 4, and from there to a hose connection (not shown) and out to a nozzle 7 via the hose 3.

Figure 2A:
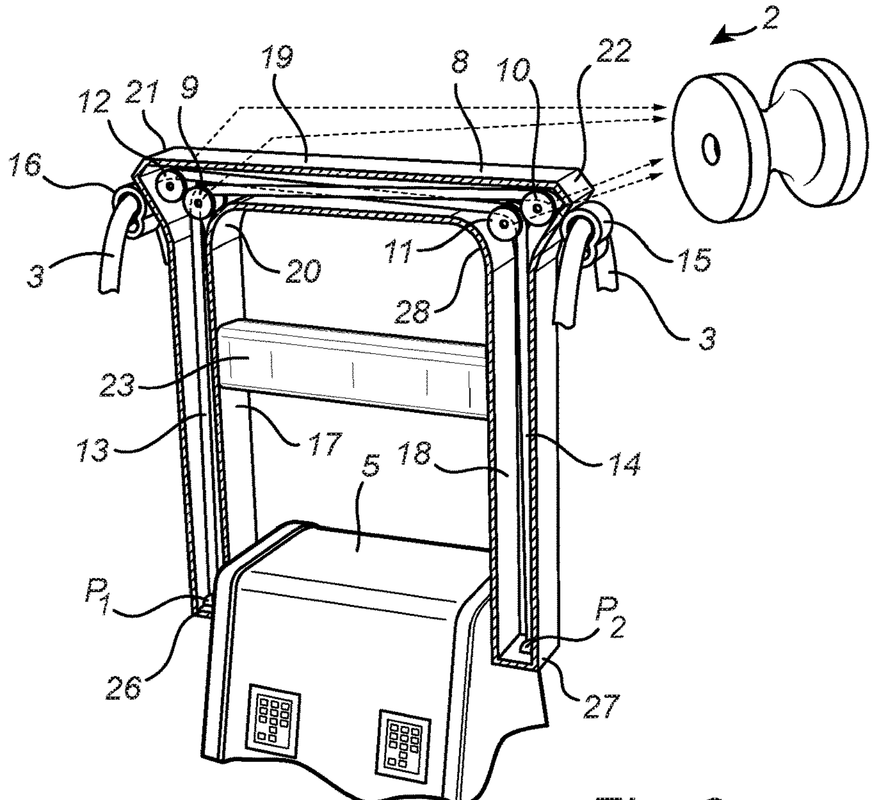
FIG. 2*a* is a perspective view the device when the hose is in an idle position.

In FIG. 2*a*, the device 2 is illustrated when the hose 3 (both of the hoses 3) is in an idle position. In this exemplary embodiment, the device 2 is arranged to handle two hoses 3. The device 2 comprises a frame element 8 which is hollow and includes a first, second, third and fourth guiding element 9, 10, 11, 12. Each guiding element comprises a roller which is rotatable around an axis. The device 2 further comprises a first and second elastic element 13, 14, and a first and second hose guiding means 15, 16. The frame element 8 comprises first and second side parts 17, 18 which are constituted the columns 6 provided on each side of the fuel dispensing unit 1, and a top part 19. The top part 19 extends in a horizontal direction and connects the first and second side parts 17, 18 at an upper end 20, 28 of the first and second side parts 17, 18, respectively. The frame element 8 further comprises a support element 23 arranged horizontally between the first and second side parts. The first elastic element 13 is attached to a first fixed point $P_1$ at one end and to the first hose guiding means 15 at the other end. The first elastic element 13 is adapted to extend from the first fixed point $P_1$, upwards vertically through the first side part 17 to a first outer end 21 of the top part 19, over the first guiding element 9 which is arranged at the first outer end 21 of the top part 19, horizontally through the top part 19 to a second outer end 22 of the top part 19, over the second guiding element 10 which is arranged at the second outer end 22 of the top part 19, out of the frame element 8 and to the first hose guiding means 15. The first hose guiding means 15 is thereby movable away from the frame element 8 allowing the hose 3 to be pulled from an idle position to an operating position when the first elastic element 13 is extended. The first hose guiding means 15 is adapted to enclose the hose 3 and is arranged adjacent to the second outer end 22 of said top part 19 when the hose 3 is in said idle position. Thus, the hose 3 is not accommodated in the frame element 8 and does not form part of the device 2. Instead, the hose 3 is held in place on the side of the fuel dispensing unit 1 by means of the hose guiding means 15. The second elastic element 14 is attached to a second fixed point $P_2$ at one end and to the second hose guiding means 16 at the other end. The second elastic element 14 is adapted to extend from the second fixed point $P_2$, upwards vertically through the second side part 18 to the second outer end 22 of the top part 19, over the third guiding element 11 which is arranged at the second outer end 22 of the top part 19, horizontally through the top part 19 to a first outer end 21 of the top part 19, over the fourth guiding element 12 which is arranged at the first outer end 21 of the top part 19, out of the frame element 8 and to the second hose guiding means 16. The second hose guiding means 16 is thereby movable away from the frame element 8 allowing the hose 3 to be pulled from an idle position to an operating position when the second elastic element 14 is extended. The second hose guiding means 16 is adapted to enclose the hose 3 and is arranged adjacent to the first outer end 21 of said top part 19 when the hose 3 is in said idle position.

Figure 2B:
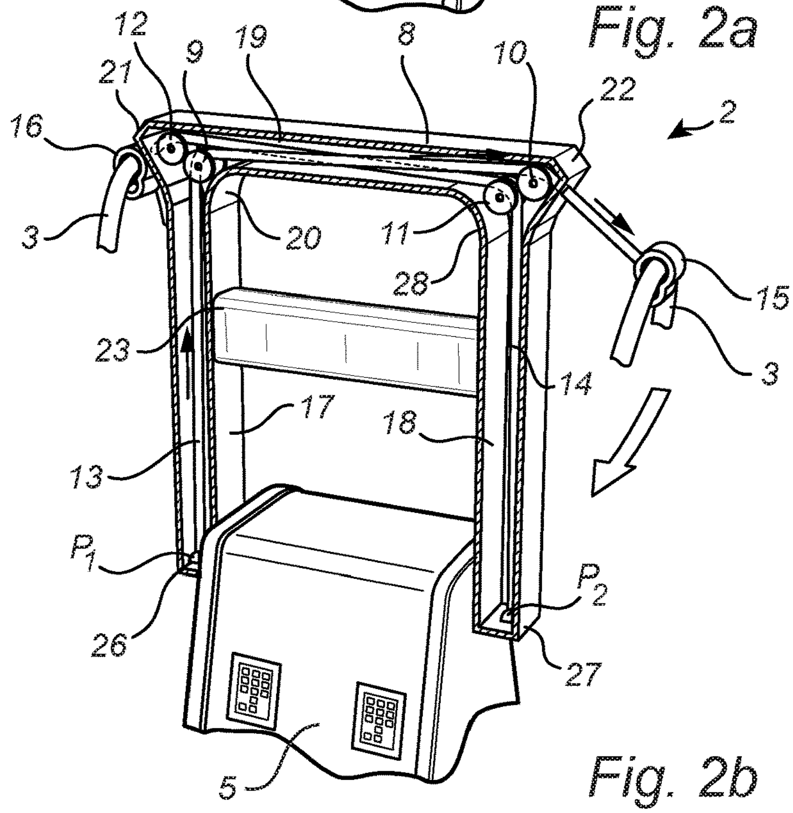
FIG. 2*b* is a perspective view the device when the hose is in an operating position.

In FIG. 2*b*, the device 2 is illustrated when one of the hoses 3 (on the left side of the fuel dispensing unit 1) is in an operating position.

Figure 3:
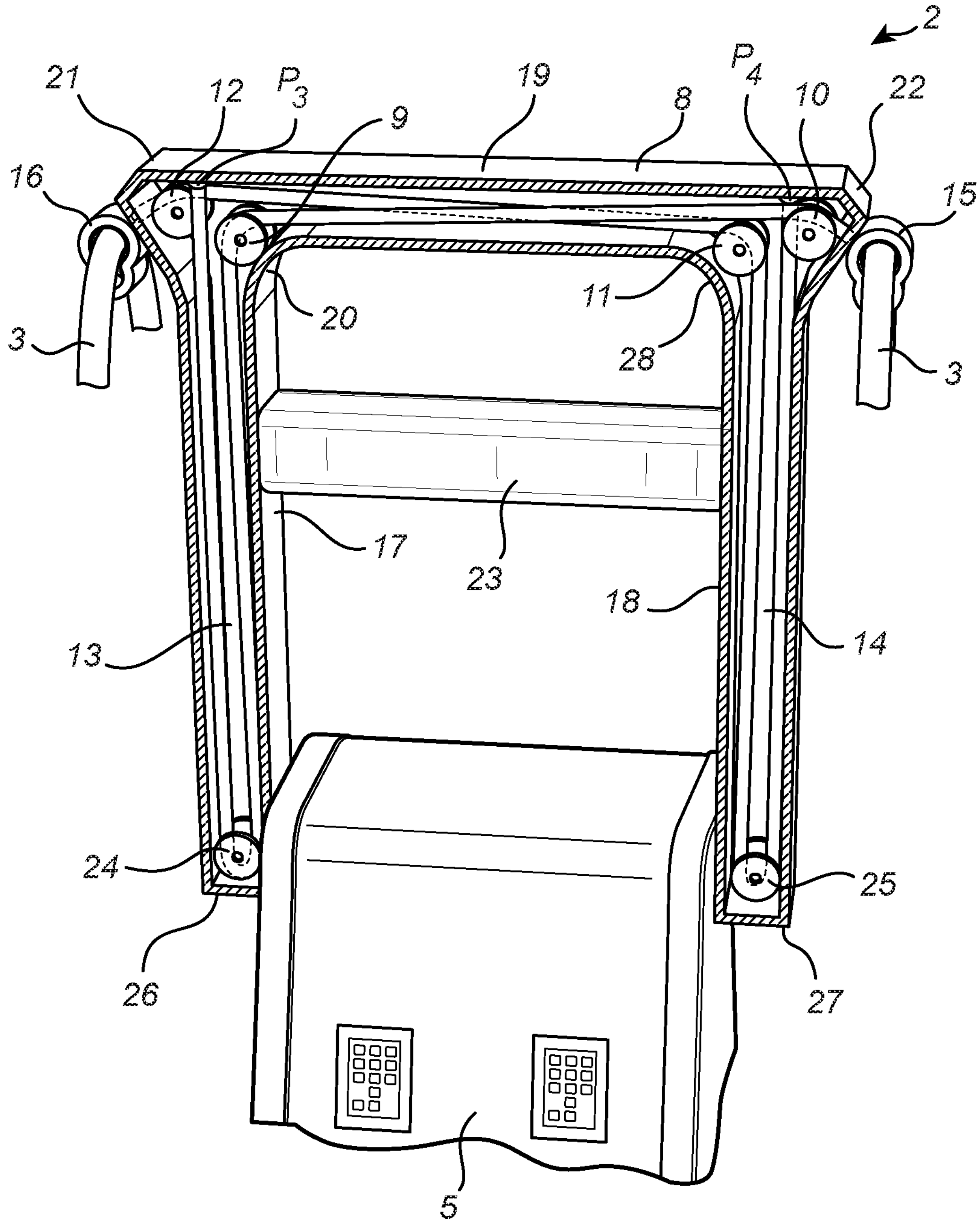
FIG. 3 is a perspective view of a fuel dispensing unit having a device according to a second exemplary embodiment of the invention.

FIG. 3 illustrates the device 2 according to a second embodiment of the invention. In this embodiment, the device 2 is arranged to handle two hoses 3 and the frame element 8 further comprises a fifth and a sixth guiding element 24, 25. The first elastic element 13 is attached to a third fixed point $P_3$ (located at the first outer 21 end of the top part 19) at one end and to the first hose guiding means 15 at the other end. The first elastic element 13 is adapted to extend from the third fixed point $P_3$, downwards vertically through the first side part 17 to a lower end 26 of the first side part 17, below the fifth guiding element 24 arranged at the lower end 26 of the first side part 14, upwards vertically through the first side part 17 to the first outer end 21 of the top part 19, over the first guiding element 9 arranged at the first outer end 21 of the top part 19, horizontally through the top part 19 to the second outer end 22 of the top part 19, over the second guiding element 10 arranged at the second outer end 22 of the top part 19, out of the frame element 8 and to the first hose guiding means 15. The second elastic element 14 is attached to a fourth fixed point $P_4$ (located at the second outer 22 end of the top part 19) at one end and to the second hose guiding means 16 at the other end. The second elastic element 14 is adapted to extend from the fourth fixed point $P_4$, downwards vertically through the second side part 18 to a lower end 27 of the second side part 18, below the sixth guiding element 25 arranged at the lower end 27 of the second side part 18, upwards vertically through the second side part 18 to the second outer end 22 of the top part 19, over the third guiding element 11 arranged at the second outer end 22 of the top part 19, horizontally through the top part 19 to the first outer end 21 of the top part 19, over the fourth guiding element 12 arranged at the first outer end 21 of the top part 19, out of the frame element 8 and to the second hose guiding means 16.

When the hose 3 is to be used to refuel a vehicle, the hose 3 is merely pulled by a user. The hose guiding means 15, 16 will follow the hose 3 and move away from the frame element 8 to an operating position, thereby extending the elastic element 13, 14 attached to the same. When the vehicle has been refueled and the user releases the pressure applied to the hose 3, the elastic element 13, 14 will pull the hose guiding means 15, 16 as well as the hose 3 back to the idle position.

The skilled person realizes that a number of modifications of the embodiments described herein are possible without departing from the scope of the invention, which is defined in the appended claims.

For instance, elastic element can be made of any suitable material, such as a rubber band, a spring wire, wire connected to a spring, and a roll of spring-loaded coiled wire.

The hose guiding means can be of any suitable shape and size. In one embodiment of the hose guiding means, the hose can slide freely through the same during use.

The guiding elements can be of any suitable shape and size and are not limited to rollers. The guiding element can, for example, be made of low friction materials and be shaped as a curved groove in which the hose can slide.

The fixed point can be located at any suitable location, both within and outside of the device as well as the fuel dispensing unit.

What is claimed is:

1. A method, comprising:

removing a nozzle from a fuel dispenser having a cabinet with fuel dispensing components and a frame having a channel defined by two opposing hollow columns that extend vertically above the cabinet and a top hollow part that extends horizontally between and connects the two opposing hollow columns, the nozzle being coupled to a first end of a hose and the hose having a second end coupled to the fuel dispenser, the hose extending through a hose guide coupled to the frame, the hose guide being coupled to a first end of an elastic element, and a second end of the elastic element being fixedly attached to an end of the channel of the frame such that a first portion of the elastic element vertically extends through the channel along one of the two opposing hollow columns and a second portion of the elastic element horizontally extends through the channel along the top hollow part, wherein the hose guide moves away from the frame to extend the elastic element when the nozzle is moved a distance away such that the hose is pulled from an idle position to an operating position.

2. The method of claim 1, wherein the hose guide is coupled to the top hollow part and moves away from the top hollow part when the hose is pulled from the idle position to the operating position.

3. The method of claim 1, wherein the elastic element moves in both vertical and horizontal directions when the elastic element is extended.

4. The method of claim 1, wherein the frame includes at least one guiding element that guides the elastic element as the elastic element is extended.

5. The method of claim 1, wherein the elastic element is fixedly attached to one of the two opposing hollow columns.

6. The method of claim 1, wherein the elastic element is fixedly attached to the top hollow part.

7. A method, comprising:

removing a nozzle from a fuel dispenser having a cabinet with fuel dispensing components and a frame having first and second hollow columns extending vertically above the cabinet and a top hollow part extending horizontally from an upper end of the first hollow column to an upper end of the second column, the nozzle being coupled to a first end of a hose and the hose having a second end coupled to the fuel dispenser, the hose extending through a hose guide coupled to the frame of the fuel dispenser, the hose guide being coupled to a first end of an elastic element, and a second end of the elastic element being fixedly attached to a lower end of the first hollow column, the lower end being opposite the upper end of the first hollow column, such that the elastic element extends through the first hollow column and through the top hollow part, wherein the hose guide moves away from the frame to stretch the elastic element from an initial length to an extended length when the nozzle is moved a distance away such that the hose is pulled from an idle position to an operating position.

8. The method of claim 7, wherein the hose guide is coupled to the top hollow part and moves away from the top hollow part when the hose is pulled from the idle position to the operating position.

9. The method of claim 7, wherein the elastic element moves in both vertical and horizontal directions when the elastic element is stretched.

10. The method of claim 7, wherein the frame includes at least one guiding element that guides the elastic element as the elastic element is stretched.

11. A fuel dispenser, comprising:

a cabinet;

a frame having first and second hollow columns, the first column vertically extending from a first side of the cabinet and the second column vertically extending from an opposing second side of the cabinet, and a top hollow part extending horizontally from an upper end of the first hollow column to an upper end of the second hollow column;

a hose guide coupled to the frame and movable away from the frame;

an elastic element having a first end coupled to the hose guide and a second end coupled to one of the first and second columns, wherein the elastic element has a first portion extending vertically through one of the first and second hollow columns of the frame and a second portion extending horizontally through the top hollow part of the frame;

a hose extending through the hose guide and configured to move the hose guide away from the frame such that the elastic element is extended; and a first unbiased guiding element disposed within the frame and having the elastic element positioned therearound such that the first unbiased guiding element guides the elastic element when the hose guide is moved away from the frame.

12. The fuel dispenser of claim 11, wherein the first unbiased guiding element is disposed at a first end of the top hollow part of the frame.

13. The fuel dispenser of claim 11, further comprising a second unbiased guiding element disposed within the frame and having the elastic element positioned therearound such that the second guiding element guides the elastic element when the hose guide is moved away from the frame.

14. The fuel dispenser of claim 13, wherein the first unbiased guiding element is disposed within the frame at a first end of the top hollow part adjacent to the first hollow column of the frame, and the second unbiased guiding element is disposed within the frame at a second end of the top hollow part adjacent to the second hollow column of the frame.

15. The fuel dispenser of claim 11, wherein the cabinet includes a hydraulics cabinet containing fuel dispensing components, and an electronics cabinet mounted above the hydraulics cabinet.

16. The fuel dispenser of claim 11, wherein the hose guide is coupled to the top hollow part of the frame adjacent to one of the first and second hollow columns.

* * * * *